United States Patent
Stanfill

(10) Patent No.: US 7,822,615 B2
(45) Date of Patent: Oct. 26, 2010

(54) TRANSLATING EXPRESSIONS IN A COMPUTING ENVIRONMENT

(75) Inventor: Craig W. Stanfill, Lincoln, MA (US)

(73) Assignee: Ab Initio Technology LLC

(*) Notice: Subject to any disclaimer, the term of this patent is extended or adjusted under 35 U.S.C. 154(b) by 1405 days.

(21) Appl. No.: 11/169,247

(22) Filed: Jun. 27, 2005

(65) Prior Publication Data

US 2006/0293875 A1    Dec. 28, 2006

(51) Int. Cl.
G06F 17/28 (2006.01)
G10L 11/00 (2006.01)
G06F 17/30 (2006.01)
G06F 9/44 (2006.01)
G06F 9/45 (2006.01)

(52) U.S. Cl. .................. 704/277; 704/2; 707/760; 717/114; 717/121; 717/136; 717/137

(58) Field of Classification Search ............... 704/2; 717/114, 136–137
See application file for complete search history.

(56) References Cited

U.S. PATENT DOCUMENTS

| | | | |
|---|---|---|---|
| 5,201,042 A * | 4/1993 | Weisner et al. ............. | 704/2 |
| 5,339,435 A | 8/1994 | Lubkin et al. | |
| 5,701,400 A | 12/1997 | Amado | |
| 5,966,072 A | 10/1999 | Stanfill et al. | |
| 6,006,242 A | 12/1999 | Poole et al. | |
| 6,088,716 A | 7/2000 | Stanfill et al. | |
| 6,173,276 B1 | 1/2001 | Kant et al. | |
| 6,208,345 B1 | 3/2001 | Sheard et al. | |
| 6,400,996 B1 | 6/2002 | Hoffberg et al. | |
| 6,538,651 B1 | 3/2003 | Hayman et al. | |
| 6,625,624 B1 * | 9/2003 | Chen et al. ............ | 707/204 |
| 6,681,386 B1 | 1/2004 | Amin et al. | |
| 6,816,825 B1 | 11/2004 | Ashar et al. | |
| 2003/0061207 A1 | 3/2003 | Spektor | |
| 2003/0135508 A1 * | 7/2003 | Chorafakis et al. ......... | 707/100 |
| 2005/0097514 A1 | 5/2005 | Nuss | |

FOREIGN PATENT DOCUMENTS

WO    WO 02/11344 A2    2/2002

* cited by examiner

*Primary Examiner*—David R Hudspeth
*Assistant Examiner*—Justin W Rider
(74) *Attorney, Agent, or Firm*—Fish & Richardson P.C.

(57) ABSTRACT

A method, and corresponding software and system, for translating an expression are described. The method includes accepting a first expression in a first syntax, the expression including a first character sequence representing a string value using the first syntax; identifying a second syntax for representing the expression; and generating a second expression in the second syntax representing the first expression, including generating a second character sequence using the first character sequence such that the second character sequence represents the string value using the second syntax.

28 Claims, 4 Drawing Sheets

TRANSLATING EXPRESSIONS IN A COMPUTING ENVIRONMENT

BACKGROUND

The invention relates to translating expressions in a computing environment.

In a shell scripting language (e.g., ksh), parameters in a shell script can be referenced using a prefix (e.g., $). In ksh, a dynamic environment maintains the values of previously defined parameters. When a shell script is run or a command line expression is evaluated, the referenced parameters are bound according to the parameter values in the dynamic environment. In some cases, when creating a script in the scripting language, it is useful to use a quoting syntax appropriate to the scripting language to preserve literal values and suppress binding of parameters within a quoted expression when the script is run. Other mechanisms can also be used to bind parameters to predefined values, such as macro expansion.

SUMMARY

In a general aspect, the invention features a method, and corresponding software and system, for translating an expression. The method includes accepting a first expression in a first syntax, the expression including a first character sequence representing a string value using the first syntax; identifying a second syntax for representing the expression; and generating a second expression in the second syntax representing the first expression, including generating a second character sequence using the first character sequence such that the second character sequence represents the string value using the second syntax.

This aspect can include one or more of the following features:

The first expression includes a plurality of executable statements.

The first expression includes command-line input.

The first character sequence includes a parameter to be bound to a referenced value.

Generating a second character sequence using the first character sequence includes: binding the parameter to the referenced value; and generating the second character sequence to include the referenced value according to a quoting syntax of the second syntax.

The first character sequence includes delimiters surrounding the parameter.

The delimiters include a predefined prefix that includes a dollar symbol followed by a quote symbol.

The delimiters include a predefined suffix that includes a quote symbol.

The first character sequence includes delimiters surrounding a representation of the string value.

The string value includes a character that is used in the first syntax to indicate a parameter reference.

Generating a second character sequence using the first character sequence includes suppressing binding of parameters within the string value.

The second syntax is selected to be compatible with a computational language such as ksh, Java, DML, C, or SQL.

The second syntax includes rules for interpreting character sequences.

Identifying the second syntax includes identifying a syntax based on a token preceding the first character sequence.

In a general aspect, the invention features a method, and corresponding software and system, for evaluating an expression. The method includes accepting one or more data structures that store definitions of parameters; identifying one or more parameters that are referenced in the expression; determining values for each of the identified parameters based on a stored definition; and storing the determined parameter values in a binding environment.

This aspect can include one or more of the following features:

The binding environment stores values for the identified parameters and for parameters whose values are necessary to evaluate the identified parameters, and the binding environment does not necessarily store values for all of the parameters whose definitions are stored in the one or more data structures.

The method further includes executing the expression with referenced parameters bound to values from the binding environment.

The expression is a portion of a program or a script.

The expression includes command-line input.

Aspects of the invention can include one or more of the following advantages:

Data processing environments can include metadata such as definitions of data transformations or record formats (e.g., written in a Data Manipulation Language). It is useful to have dynamic metadata that can be defined in terms of literal values that are captured at runtime. Translating a target expression according to an identified syntax not only enables a literal value to be captured, but also enables the literal value to be quoted in a way that is appropriate to the identified syntax. Furthermore, by honoring a quoting convention for an identified syntax, some literal values can be preserved in the evaluation of a target expression.

A computing system may store values of parameters in a binding environment. When an expression is evaluated (e.g., an expression in a shell script or a command line expression), the referenced parameters are bound according to the parameter values in the binding environment. There is overhead associated with maintaining parameter values in the binding environment. To avoid having to maintain a binding environment with values for every parameter that has been defined (e.g., in a list of parameters and their definitions), the computing system can scan an expression to determine values only for the parameters that are actually referenced in that expression and the parameters whose values are necessary to evaluate the referenced parameters. Other features and advantages of the invention will become apparent from the following description, and from the claims.

DESCRIPTION

1 Overview

Figure 1:
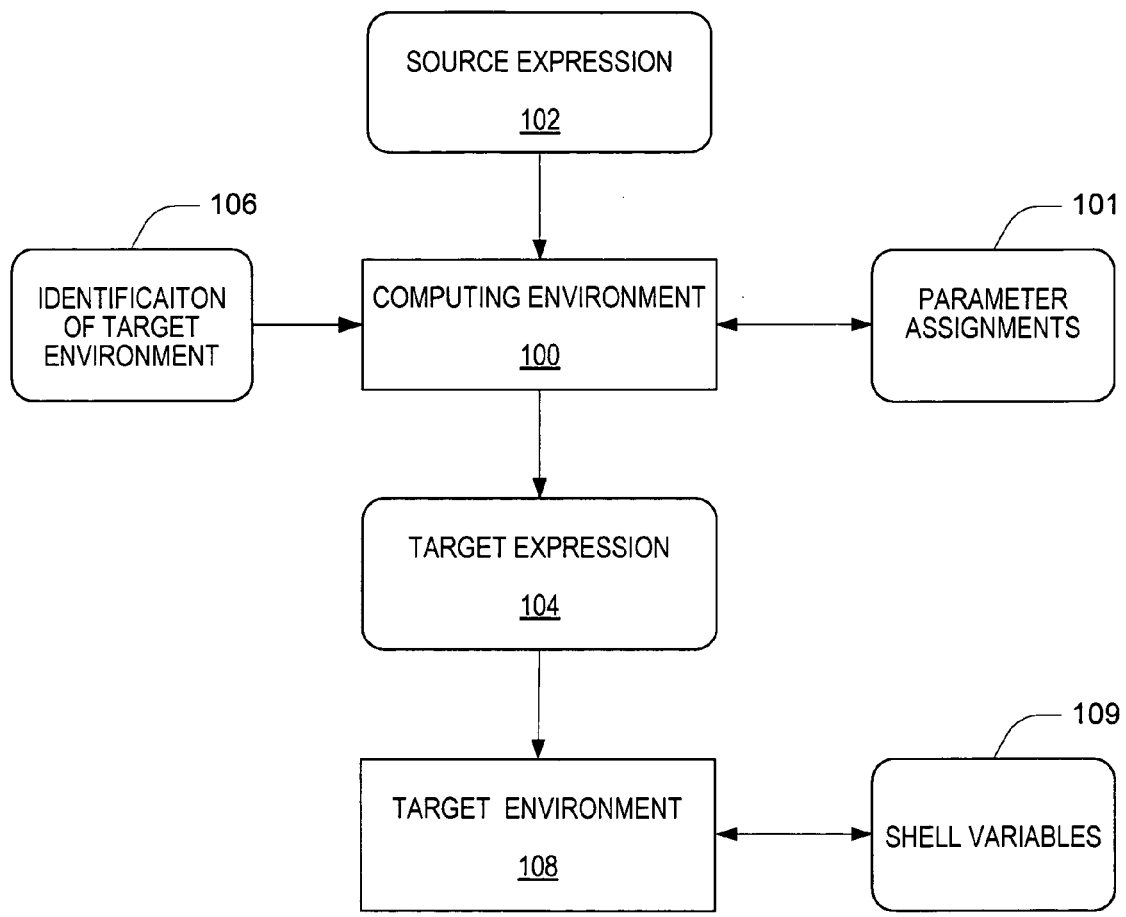
FIG. 1 is a block diagram representing interaction between a computing environment and a target environment.

Referring to FIG. 1, a computing environment 100 supports the specification of a source computing expression 102 (e.g., a script, program, pathname, etc.) using a source syntax, and then translating that source expression 102 to a target expression 104 that uses a target syntax suitable for evaluation (e.g., execution, expansion, etc.) in one of a number of possible target environments. The computing environment 100 includes a process 106 for identifying a particular target environment 108, such as shell environment or computer programming language environment, in which to evaluate the target expression 104. The process 106 may identify a target environment based on information in the target expression 104, based on other user input, or based on a default environment.

As part of this translation, selective parameter substitution is performed such that some parameter references may be resolved at the time of translation based on parameter assignments 101, while other parameter references may be resolved when the translated expression is later evaluated (e.g., based on shell variables 109). The translation process depends on characteristics of the target syntax, in particular, those characteristics related to quoting strings and to parameter references.

It can be desirable to have literal values preserved in the evaluation of a target expression. In general, each of the target syntaxes includes some type of provision for quoting a literal value so that it is not evaluated according to other aspects of the syntax, such as aspects of the syntax relating to operators, parameter substitution, or delimiters.

Some of the literal values in the target expression may be introduced during the translation based on symbolic values in the source expression, for example, based on parameter substitution. That is, the value of a desired literal expression in the target expression may not be known when the source expression is specified.

A source expression can be defined in a language, e.g., a Parameter Definition Language (PDL), that can produce the desired target expression by capturing some of the values to be quoted at the time the source expression is evaluated. Such a PDL includes a mechanism for generating a quoted literal in the appropriate syntax of one of a variety of possible target languages. An "expression" can include, for example, a portion of a script or program (including the entire script or program), or command-line input.

Figure 2:
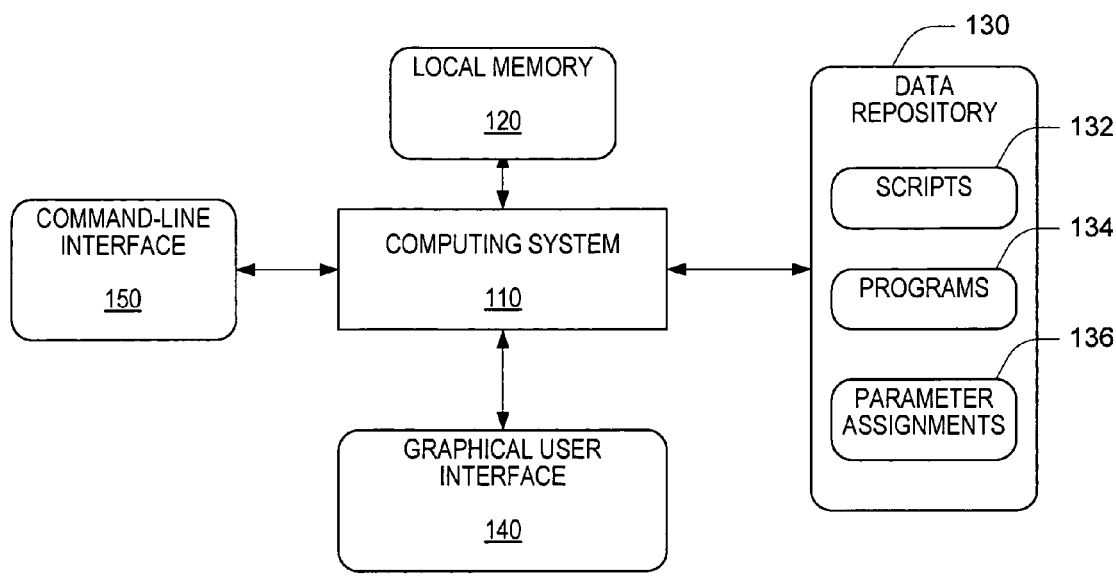
FIG. 2 is a block diagram of a computing environment for translating expressions.

FIG. 2 shows an exemplary computing environment 100 for evaluating PDL expressions and executing resulting target expressions in the syntax of one or more target languages (e.g., shell languages or other scripting languages). The computing environment 100 includes a computing system 110 that includes a local memory 120 (e.g., a random access memory) and a data repository 130 (e.g., resident on one or more non-volatile storage media). The data repository 130 stores functional data such as scripts 132, programs 134, and parameters assignments 136 (e.g., including parameter names, parameter values, and optionally, parameter attributes) that can be arranged in sets of parameters that can be used in any of a variety of scripts 132 and/or programs 134. A user can interact with the computing system through a graphical user interface (GUI) 140 and/or through a command-line interface (CLI) 150.

The parameter assignments 136 can include parameters defined using source PDL expression that provides a consistent syntax in which a user can define parameter values to be translated into any of a variety of target syntaxes. Parameter definitions can refer to values of other parameters. Any of a variety of rules can be used to determine which parameters can refer to which other parameters (e.g., an ordered list—a parameter definition can refer to a previously defined parameter; or sets—a parameter in one set can refer to a parameter in another set).

An approach for evaluating source PDL expressions, described in more detail below, includes accepting a PDL expression, identifying a target syntax for representing the PDL expression, and generating a representation of the PDL expression according to the target syntax. For example, a script including PDL expressions can include a series of inline tokens each followed by a PDL expression. The computing system 110 identifies the target syntax by reading each token in the script that indicates a target language to be used to interpret the PDL expression that follows. Thus, the target syntax can change within a script by including different tokens in the script indicating different target languages to be used to interpret different portions of the script.

The accepted PDL expression can include a character sequence representing a string value. The character sequence can represent a string value (a) through a parameter reference (e.g., a prefix for a parameter indicating the value of the parameter is to be bound to the string value). Alternatively, the character sequence can represent a string value (b) through a quoted literal expression (e.g., delimiters surrounding a representation of the string value).

If the character sequence in the PDL expression represents a string value (a) through a parameter reference, the computing system 110 identifies the type of parameter reference, for example, according to the syntax of the reference. The reference can be a "direct substitution" parameter reference, in which case the computing system 110 binds the parameter reference to a parameter value. Alternatively, the reference can be a "substitution plus quoting" parameter reference, in which case the computing system 110 binds the parameter reference to a parameter value using the mechanism for generating quoted literals in a target syntax, as described in more detail below (e.g., in section 2.2.3).

If the character sequence in the PDL expression represents a string value (b) through a quoted literal expression, the computing system 110 preserves the string value in the literal expression without performing substitution. The computing system 110 determines what is to be interpreted as a quoted literal expression based on the target syntax. If a character sequence that would otherwise represent a parameter reference (e.g., a direct substitution parameter reference) is embedded within a quoted literal expression, then that character sequence is not treated as a parameter reference (e.g., is not bound to a parameter value).

When the computing system 110 binds parameter references to values, to avoid having to spend the time to set up a dynamic environment with values for every parameter that has been defined (e.g., in a list of parameters and their definitions), the computing system 110 can scan an expression to determine values only for the parameters that are actually referenced in that expression. Since parameters can be defined in terms of other parameters, some parameters that are not directly referenced in the expression may also be evaluated in the process of evaluating the directly referenced parameters. The values of the directly or indirectly referenced parameters are stored in a binding environment in the local memory 120. After the computing system 110 evaluates a PDL expression, the computing system generates a target expression in a corresponding target syntax. The computing system 110 may then execute the target expression and/or store the target expression in the data repository 130.

2 Expression Translation

The translation of expressions from the source syntax to the target syntax can involve parameter substitution using a value of a parameter known at translation time. The source PDL syntax uses a number of "$-substitution" syntaxes to replace a parameter with a value.

The source PDL syntax uses a first type of "$-substitution" syntax that uses a "direct substitution" parameter reference. This syntax uses $<name>, such as $foo, with the value of the parameter foo directly substituting for the string $ foo. Note that such substitution is not performed when the $ is used in a string literal such as 'the price is $12.00'.

An example of direct substitution, with the parameter foo having the value 1.00, would take a source expression if ($foo==3.14)

and yield a target expression if (1.00==3.14)

in which the $ character is used as a prefix to indicate that the value assigned to the parameter foo should be substituted for the direct substitution parameter reference $foo.

In some cases, however, the value substituted for a parameter reference may not be guaranteed to be legal in the target syntax (e.g., according to a target language such as a Data Manipulation Language (DML)). For example, if foo is assigned a value "(" (i.e., a character string of length one representing the left-paren character) in the source parameter binding environment, then the source expression above yields the target expression if ((==3.14)

which is an illegal expression in the target syntax if the target language is DML.

If instead the source expression is if ("$foo"==3.14)

then the same parameter substitution in this source expression yields the legal target expression if ("("==3.14)

(assuming the computing system 110 is not in a processing mode in which double-quotes are protecting delimiters, as described below).

However, if foo is assigned a value '"' (i.e., a character string of length one representing the double-quote character), then the parameter substitution for this value of foo in the source expression above yields the target expression if ("""==3.14)

which is an illegal syntax if the target language is DML.

The source PDL syntax uses a second type of "$-substitution" syntax that uses a "substitution plus quoting" parameter reference. The computing system 110 binds the parameter reference to a parameter value and generates a quoted literal in the designated target syntax. This type of parameter reference can be indicated by a pre-defined set of delimiters. In PDL, the delimited "substitution plus quoting" parameter reference is given by $"foo" (or equivalently by $'foo').

Using this "substitution plus quoting" parameter reference, if foo is assigned a value "(" (i.e., a character string of length one representing the left-paren character), then the source expression if ($"foo"==3.14)

yields the target expression if ("("==3.14)

which is a legal syntax if the target language is DML.

Again, using this "substitution plus quoting" parameter reference, if foo is assigned a value '"' (i.e., a character string of length one representing the double-quote character), then the source expression if ($"foo"==3.14)

yields the target expression if ("\""==3.14)

if, for example, the target language is DML, since DML requires a quoted quote mark to be preceded by the escape character \. If a different target language is used then the target expression may use a different syntax. For example, the source expression if ($"foo"==3.14)

yields the target expression if (""""==3.14)

if the target language is ksh.

The target syntax may be indicated by a token embedded within a source expression, such as "$-ksh" to indicate ksh as the target language, or "$-dml" to indicate DML as the target language. Some tokens may indicate a target syntax that does not have a corresponding target language (e.g., $-literal), but still have a well defined syntax defined by a set of rules. After the computing system 110 recognizes a token for a target syntax, the expression evaluation is placed into a "processing mode" that corresponds to that target syntax.

The "substitution plus quoting" parameter reference mechanism provides a way for target syntax values to be captured after a source PDL expression is written and quoted in a manner determined by the processing mode appropriate to the target syntax. A target syntax value that is known when the source PDL expression is being written can be preserved as a literal value consistent with the target syntax by enclosing it inside predetermined "protecting delimiters"(such as double or single quotes without a leading "$" character). That is, the source syntax does not require substitution within delimited strings.

For example, if the string $PI is a special character string that represents the value of pi in the DML target language, then this string can be enclosed in double quotes when included in a DML character sequence (as "$PI") and it will remain unchanged, without having to "escape" the direct substitution, for example, by using "\$PI". A different target language may use different protecting delimiters to protect the character sequence, such as '$PI' for the ksh target language. When evaluating a PDL expression, the computing system 110 honors the protecting delimiters by turning off both "direct substitution" parameter references and "substitution plus quoting" parameter references inside the protecting delimiters. The computing system 110 determines what the protecting delimiters are (if any) according to the processing mode.

2.1 Target Syntax Processing Modes

Different target syntax processing modes result in different behavior for evaluating PDL expressions. The computing system 110 may recognize a processing mode by reading an embeded token; however, a default processing mode can be assumed if no token is present. The expression evaluation behavior for four exemplary processing modes are summarized as follows:

Target syntax: ksh
Token: $-ksh

Processing mode behavior: The computing system 110 uses a quoting syntax consistent with the ksh target language for "substitution plus quoting" and recognizes protected delimiters used by the ksh target language.

Target syntax: DML
Token: $-dml

Processing mode behavior: The computing system 110 uses a quoting syntax consistent with the DML target language for "substitution plus quoting" and recognizes protected delimiters used by the DML target language.

Target syntax: text
Token: $-text

Processing mode behavior: The computing system 110 uses a quoting syntax consistent with the DML target language for "substitution plus quoting" but does not recognize any delimiters as protected delimiters.

Target syntax: literal
Token: $-literal

Processing mode behavior: The computing system 110 does not perform "substitution plus quoting" or "direct substitution" parameter binding and outputs everything between the $-literal token and a following token, if any, verbatim (except for any spaces immediately following the token).

These inline tokens are not translated into the corresponding target expressions.

2.2 PDL Evaluation Rules

A PDL expression can be used to provide a value that is included in a set of parameter assignments. Some portions of a PDL expression can include statements that manipulate values local to the translation of the PDL expression, and are not reflected directly in a resulting target expression. The computing system 110 uses the following exemplary set of rules for interpreting characters in a PDL expression.

2.2.1 Parameter Assignment

The values of parameters referenced in a source PDL expression can be assigned separately from the PDL expression (e.g., in a file including a set of parameter assignments), or inline with the PDL expression (e.g., in a script including one or more PDL expressions). Such inline parameter assignments are not translated into the corresponding target expression. Determining values for parameters referenced in a PDL expression may involve translating other PDL expressions and evaluating the resulting target expressions.

2.2.2 Direct Substitution Parameter Reference

The "$" character directly preceding a token without quotation marks indicates a "direct substitution" parameter reference. The parameter reference is bound to a value that is substituted for the parameter reference. For example, the character sequence $BAR in an expression may be evaluated to generate the character sequence xxx. Then, the character sequence FOO$BAR in an expression would be evaluated to generate the character sequence FOOxxx.

Delimiters can be used to delimit characters that represent a parameter to be referenced. For example, braces can be used so that the character sequence FOO${BAR}BAZ is evaluated to generate the character sequence FOOxxxBAZ, rather than be interpreted as FOO$BARBAZ.

2.2.3 Substitution Plus Quoting Parameter Reference

The "$" character used in combination with single or double quotes to delimit a token indicates a "substitution plus quoting" parameter reference. The parameter is bound to a value that is substituted for the referenced parameter and the resulting character sequence is quoted according to the target syntax. For example, the character sequence $"BAR" or the character sequence $'BAR' in an expression is evaluated to generate the character sequence 'xxx' (for target syntax that uses single quotes, where BAR is assigned the value xxx as in the examples above). Likewise, if the parameter assignment TERMINATOR=| is made, the character sequence string ($"TERMINATOR") in an expression is evaluated to generate the character sequence string ('|').

In another example, a target syntax requires a single literal backslash character "\" to be designated by two backslash characters "\\" in a quoted literal string. In this case, when the parameter assignment TERMINATOR=\ is made, the character sequence string ($ "TERMINATOR") in an expression is evaluated to generate the character sequence string ('\\').

2.2.4 Escaping Special Characters

A literal "$" character can be specified in the source PDL syntax using a character as a prefix to "escape" the parameter substitution behavior. For example, if the escape character is the backslash symbol, the character sequence FOO\$BAR in an expression is evaluated to generate the character sequence FOO$BAR.

To generate a literal "\" character before a "$" character, two backslash characters "\\" may be used. For example, the character sequence \\$BAR in an expression is evaluated to generate the character sequence \xxx in which the direct parameter substitution is made. In general, if there are an even number of "\" characters before a "$" character, then the "\" characters are paired and the "$" character is interpreted as a parameter reference. If there are an odd number of "\" characters before a "$" character, then the adjacent "\" character causes the "$" character to be interpreted literally and any remaining "\" characters are paired. So, the character sequence \\\$BAR in an expression is evaluated to generate the character sequence \$BAR, and the character sequence \\\\$BAR in an expression is evaluated to generate the character sequence \\xxx.

2.2.5 Protecting Delimiters

The computing system 110 preferably honors protecting delimiters by turning off both "direct substitution" parameter references and "substitution plus quoting" parameter references inside the protecting delimiters. For example, to interpret the sequence of characters $BAR as a literal string, protecting delimiters such as double or single quotes can be used to yield the protected literal string: "$BAR". Furthermore, no escaping of special characters is necessary inside a protected literal string.

2.2.6 Inline Execution

An "inline" executable computation or script can be executed while evaluating a PDL expression. This inline execution is indicated using another type of delimiter. The name of the executable computation or script, for example exec, is delimited as $ (exec) in an expression and is replaced by the results of executing exec (e.g., a captured output of the computation or script).

An inline script can include parameter references that are "transparent." A transparent reference of the parameter PARM takes one of the following two forms: $PARM or ${PARM}. So, the character sequence $ (echo $BAR) in an expression is evaluated to generate the character sequence xxx. However, other types of "opaque" parameter references such as: $ (eval echo '$'FOO) or $ (printenv FOO) do not result in parameters being bound to their assigned values.

A particular type of delimiter can be used to indicate that an executable computation or script is to be executed in a particular language. For example, $ (exec) can indicate execution of exec according to ksh, and $ [exec] can indicate execution of exec according to DML. Alternatively, an inline token can be used to indicate execution in a particular language. For example, $ (ksh exec) can indicate execution of exec according to ksh, and $ (dml exec) can indicate execution of exec according to DML.

3 Parameter Binding Approach

Figure 3:
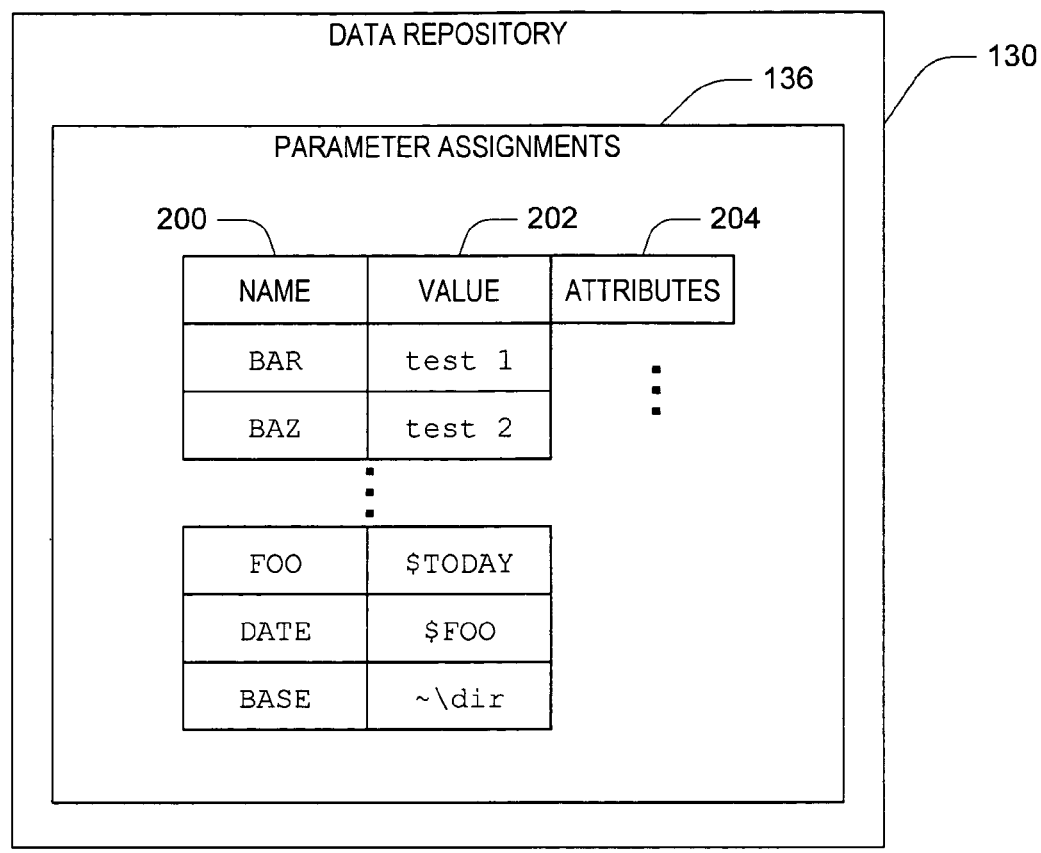
FIG. 3 is a block diagram showing contents of a storage area for parameter assignments in a data repository.

FIG. 3 shows exemplary parameter assignments 136 stored in the data repository 130. The parameters assignments 136 include parameter names 200, parameter values 202, and optionally, parameter attributes 204. A parameter attribute can include any information associated with a parameter or its value, such as a data type or a description. In this example, a value assigned to a parameter may include a reference to any preceding parameter, such as the parameter DATE that has a value of $FOO.

Figure 4:
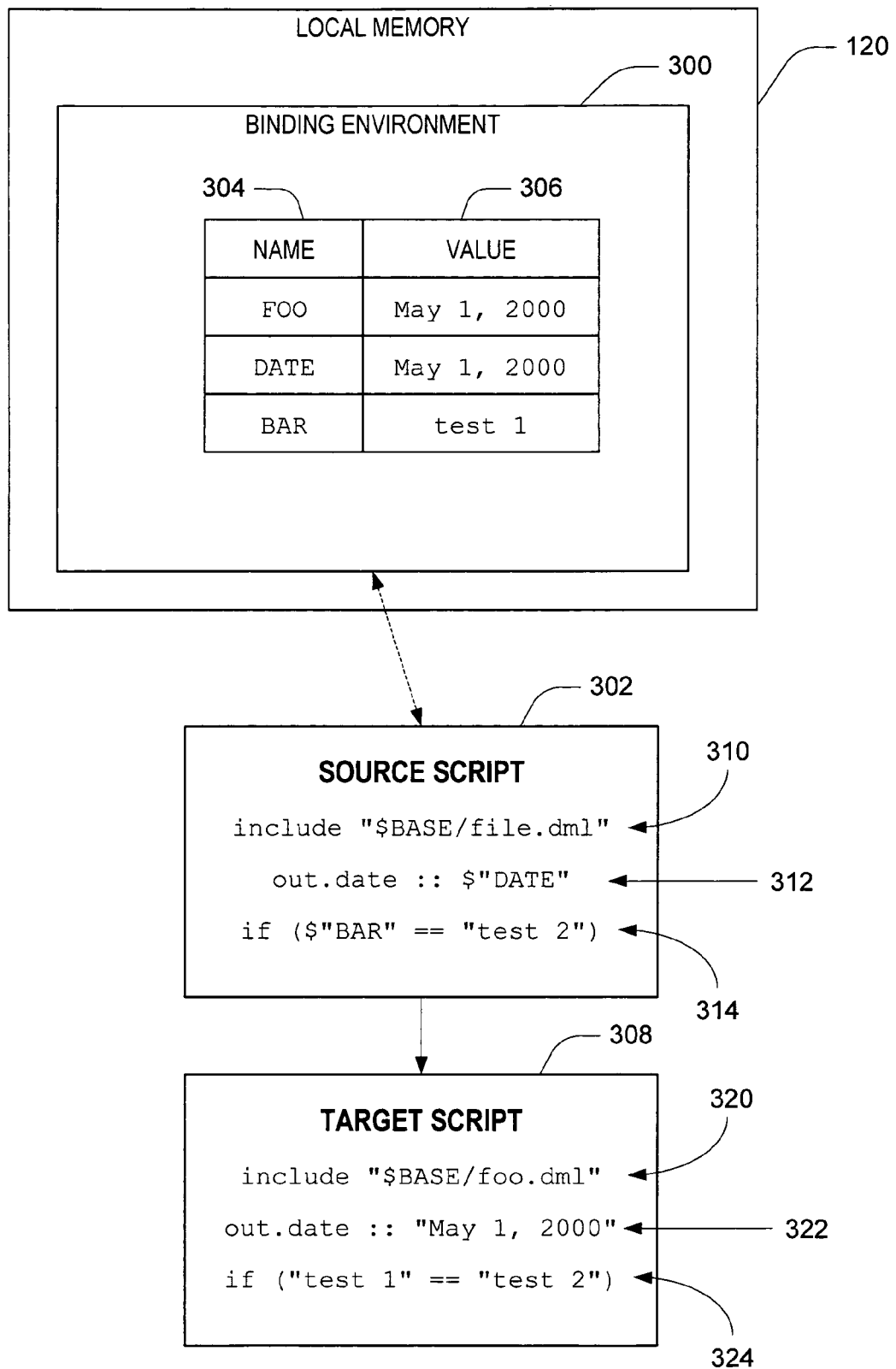
FIG. 4 is a block diagram showing contents of a binding environment in a local memory.

Referring to FIG. 4, in an exemplary parameter binding approach, the computing system 110 maintains a binding environment 300 in the local memory 120 for parameters associated with a source script 302 that is being evaluated. As the computing system 110 evaluates the source script 302, the computing system 110 maintains in the binding environment 300 a copy of each parameter that is referenced in the source script 302. The information stored in the binding environment 300 includes a parameter name 304 and a current value 306 of that parameter. Each parameter is bound to a value according to the appropriate scoping rules. In some cases, the computing system 110 maintains multiple contexts in the binding environment 300 to store parameters having different scopes.

In this example, the source script 302 includes a first source expression 310 that includes the character sequence "$ BASE/file.dml". This character sequence represents a string value as a quoted literal expression (e.g., in the DML processing mode). The computing system 110 suppresses binding of what would otherwise be a parameter reference $BASE in the source syntax. The parameter reference $BASE is then preserved to be bound later (e.g., bound to the value ~\dir when the corresponding target expression is evaluated).

The source script 302 includes a second source expression 312 that includes the character sequence $ "DATE", which represents a string value through a "substitution plus quoting" parameter reference. Since the referenced parameter DATE is defined (in FIG. 3) in terms of another parameter FOO, the computing system 110 first binds parameter FOO to its assigned value $TODAY, which resolves to May 1, 2000 and stores the results in the binding environment 300. The computing system 110 then binds the parameter DATE to the value May 1, 2000 and stores the results in the binding environment 300.

The source script 302 includes a third source expression 314 that includes the character sequence $ "BAR", which represents a string value through a "substitution plus quoting" parameter reference. The computing system 110 binds parameter BAR to the value test 1 and stores the results in the binding environment 300.

The computing system 110 generates a target script 308 that includes a first target expression 320 that represents the first source expression 310 in the target syntax. Since the character sequence "n $BASE/file.dml" in the source expression 310 includes protecting delimiters (according to the DML processing mode), the target expression 320 includes the same character sequence.

The target script 308 includes a second target expression 322 in which the quoted value "May 1, 2000 " has been substituted for the parameter reference $ "DATE", and a third target expression 324 in which the quoted value "test 1 " has been substituted for the parameter reference $ "BAR".

The computing system 110 generates the target expressions after the source script 302 has been scanned for parameter references and the referenced values have been stored in the binding environment 300. Alternatively, the computing system can generate the target expressions as the source script 302 is being scanned. The computing system 110 is then able to execute the generated target script 308 and/or store the target script 308 for later execution.

The expression evaluation techniques described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A computer implemented method for translating an expression, including:
   accepting, using a computer, a first expression in a first syntax, the expression including a first character sequence representing a quoted string value using the first quoting syntax;
   identifying a second syntax for representing the expression; and
   generating, using a computer, a second expression in the second syntax representing the first expression, including generating a second character sequence using the first character sequence such that the second character sequence represents the quoted string value using the second syntax.

2. The method of claim 1, wherein the first expression includes a plurality of executable statements.

3. The method of claim 1, wherein the first expression includes command-line input.

4. The method of claim 1, wherein the first character sequence includes a first parameter to be bound to a first referenced value.

5. The method of claim 4, wherein generating a second character sequence using the first character sequence includes:
   binding the first parameter to the first referenced value; and
   generating the second character sequence to include the referenced value according to a quoting syntax of the second syntax.

6. The method of claim 4, wherein the first character sequence includes delimiters surrounding the first parameter.

7. The method of claim 6, wherein the delimiters include a predefined prefix that includes a dollar symbol followed by a quote symbol.

8. The method of claim 6, wherein the delimiters include a predefined suffix that includes a quote symbol.

9. The method of claim 4, wherein the first referenced value includes a second parameter to be bound to a second referenced value.

10. The method of claim 9, wherein binding the first parameter to the first referenced value includes:
    accepting a list of parameter references and corresponding values including the first parameter and the first referenced value, the first referenced value including the second parameter;
    evaluating the parameter references including parsing the first referenced value to identify the second parameter; and
    binding the second parameter to the second referenced value.

11. The method of claim 4, wherein binding the first parameter to the first referenced value includes generating a quoted literal from the first referenced value according to the second syntax.

12. The method of claim 1, wherein the first character sequence includes delimiters surrounding a representation of the quoted string value.

13. The method of claim 12, wherein the quoted string value includes a character that is used in the first syntax to indicate a parameter reference.

14. The method of claim 13, wherein generating a second character sequence using the first character sequence includes suppressing binding of parameters within the quoted string value.

15. The method of claim 1, wherein the second syntax is selected to be compatible with a computational language.

16. The method of claim 15, wherein the computational language is a member of the group consisting of ksh, Java, DML, C, and SQL.

17. The method of claim 1, wherein the second syntax includes rules for interpreting character sequences.

18. The method of claim 1, wherein identifying the second syntax includes identifying a syntax based on a token preceding the first character sequence.

19. Software stored on a computer-readable medium, for translating an expression, the software including instructions for causing a computer system to:
    accept a first expression in a first syntax, the expression including a first character sequence representing a quoted string value using the first syntax;
    identify a second syntax for representing the expression; and
    generate a second expression in the second syntax representing the first expression, including generating a second character sequence using the first character sequence such that the second character sequence represents the quoted string value using the second syntax.

20. A system for translating an expression, including:
    means for accepting a first expression in a first syntax, the expression including a first character sequence representing a quoted string value using the first syntax;
    means for identifying a second syntax for representing the expression; and
    means for generating a second expression in the second syntax representing the first expression, including generating a second character sequence using the first character sequence such that the second character sequence represents the quoted string value using the second syntax.

21. A method for evaluating an expression, including:
    accepting one or more data structures that store definitions of parameters;
    identifying one or more parameters that are referenced in the expression;
    determining values for each of the identified parameters based on a stored definition, including determining a value for at least one parameter where the stored definition of the parameter references a second parameter; and
    storing the determined parameter values in a binding environment.

22. The method of claim 21, wherein the binding environment stores values for the identified parameters and the binding environment stores values for parameters whose values are necessary to evaluate the identified parameters, and the binding environment does not store values for all of the parameters whose definitions are stored in the one or more data structures.

23. The method of claim 21, further including executing the expression with referenced parameters bound to values from the binding environment.

24. The method of claim 21, wherein the expression is a portion of a program or a script.

25. The method of claim 21, wherein the expression includes command-line input.

26. The method of claim 21, wherein identifying one or more parameters that are referenced in the expression includes identifying one or more parameters that are referenced in the stored definition.

27. Software stored on a computer-readable medium, for evaluating an expression, the software including instructions for causing a computer system to:
    accept one or more data structures that store definitions of parameters;
    identify one or more parameters that are referenced in the expression;
    determine values for each of the identified parameters based on a stored definition; and
    store the determined parameter values in a binding environment.

28. A system for evaluating an expression, including:

means for accepting one or more data structures that store definitions of parameters;

means for identifying one or more parameters that are referenced in the expression;

means for determining values for each of the identified parameters based on a stored definition; and means for storing the determined parameter values in a binding environment.

\* \* \* \* \*